US011794120B2

(12) United States Patent
Koch

(10) Patent No.: US 11,794,120 B2
(45) Date of Patent: *Oct. 24, 2023

(54) SYSTEMS AND METHODS FOR TOKENIZING AND SHARING MOMENTS IN A GAME

(71) Applicant: Mythical, Inc., Sherman Oaks, CA (US)

(72) Inventor: Rudy Koch, Sammamish, WA (US)

(73) Assignee: Mythical, Inc., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/513,039

(22) Filed: Oct. 28, 2021

(65) Prior Publication Data

US 2022/0072437 A1 Mar. 10, 2022

Related U.S. Application Data

(63) Continuation of application No. 16/853,482, filed on Apr. 20, 2020, now Pat. No. 11,192,036.

(51) Int. Cl.
*A63F 13/86* (2014.01)
*A63F 13/79* (2014.01)

(52) U.S. Cl.
CPC ............ *A63F 13/86* (2014.09); *A63F 13/79* (2014.09)

(58) Field of Classification Search
None
See application file for complete search history.

(56) References Cited

U.S. PATENT DOCUMENTS

| 8,469,801 B2 | 6/2013 | Ocko |
| 9,452,356 B1 | 9/2016 | Tsao |
| 9,665,239 B1 | 5/2017 | Koh |
| 9,895,613 B1 | 2/2018 | Holtz |

(Continued)

FOREIGN PATENT DOCUMENTS

WO    2020247002    12/2020

OTHER PUBLICATIONS

RockstarFlipper, "Ebay for Beginners, Episode #5. Top Rated Seller & Feedback"—(https://www.youtube.com/watch?v=6tk9sZ95ZW8), Mar. 19, 2017 (Year: 2017).

(Continued)

*Primary Examiner* — Jason T Yen
(74) *Attorney, Agent, or Firm* — ESPLIN & ASSOCIATES, PC

(57) ABSTRACT

Systems and methods for tokenizing moments in a game are disclosed. Exemplary implementations may: create an asset that represents a set of rights pertaining to an occurrence of a given moment in the game. The given moment includes a transition from a first user game state to a second user game state that has occurred to a given user-controlled character. The set of rights includes a right to a given type of usage of the asset. Implementations may include recording ownership of the asset; receiving a request for using the asset according to the given type of usage; verifying whether the requesting player owns the given right; creating a presentation of the game as requested; and presenting the presentation to the requesting player.

18 Claims, 4 Drawing Sheets

(56) References Cited

U.S. PATENT DOCUMENTS

| | | |
|---|---|---|
| 10,512,843 B1 | 12/2019 | Cunningham |
| 10,518,178 B1 | 12/2019 | Cunningham |
| 10,765,948 B2 | 9/2020 | Eatedali |
| 10,850,202 B1 | 12/2020 | Koch |
| 10,861,095 B1 | 12/2020 | Koch |
| 10,946,283 B1 | 3/2021 | Meilich |
| 10,946,291 B1* | 3/2021 | Harris ..................... A63F 13/85 |
| 10,984,400 B1 | 4/2021 | Koch |
| 11,044,098 B1 | 6/2021 | Thacker |
| 11,045,729 B2 | 6/2021 | Yoshida |
| 11,135,516 B1 | 10/2021 | Koch |
| 11,138,580 B1 | 10/2021 | Koch |
| 11,141,664 B1 | 10/2021 | Koch |
| 11,148,058 B1 | 10/2021 | Koch |
| 11,173,401 B1 | 11/2021 | Linden |
| 11,173,402 B1 | 11/2021 | Koch |
| 11,173,404 B1 | 11/2021 | Koch |
| 11,179,638 B1 | 11/2021 | Linden |
| 11,179,640 B1 | 11/2021 | Koch |
| 11,192,033 B1 | 12/2021 | Koch |
| 11,192,036 B1 | 12/2021 | Koch |
| 11,224,818 B2 | 1/2022 | Cunningham |
| 11,229,848 B1 | 1/2022 | Koch |
| 11,238,477 B1 | 2/2022 | Koch |
| 11,288,759 B1 | 3/2022 | Linden |
| 11,325,046 B1 | 5/2022 | Koch |
| 11,328,358 B2 | 5/2022 | Koch |
| 11,383,171 B1 | 7/2022 | Stoyanov |
| 11,439,903 B2 | 9/2022 | Hayashi |
| 11,511,201 B1 | 11/2022 | Thacker |
| 2005/0137015 A1 | 6/2005 | Rogers |
| 2006/0100006 A1 | 5/2006 | Mitchell |
| 2006/0190392 A1 | 8/2006 | Samid |
| 2007/0087831 A1 | 4/2007 | Van Luchene |
| 2007/0099685 A1 | 5/2007 | Van Luchene |
| 2007/0202951 A1 | 8/2007 | Bogosian |
| 2009/0113040 A1 | 4/2009 | Zalewski |
| 2009/0113554 A1 | 4/2009 | Zalewski |
| 2009/0318221 A1 | 12/2009 | Dhunjishaw |
| 2009/0325690 A1* | 12/2009 | Zhou ..................... A63F 13/335 463/29 |
| 2010/0205430 A1 | 8/2010 | Chiou |
| 2011/0183749 A1 | 7/2011 | Allen |
| 2011/0312424 A1* | 12/2011 | Burckart ............ H04N 21/4781 709/204 |
| 2013/0172086 A1 | 7/2013 | Ikenaga |
| 2014/0011595 A1 | 1/2014 | Muller |
| 2014/0058806 A1 | 2/2014 | Guenette |
| 2014/0162781 A1 | 6/2014 | Butler |
| 2015/0170112 A1 | 6/2015 | Decastro |
| 2015/0224409 A1 | 8/2015 | Hayashida |
| 2015/0371295 A1 | 12/2015 | Gill |
| 2015/0375103 A1* | 12/2015 | George ................. A63F 13/497 463/24 |
| 2016/0005270 A1 | 1/2016 | Marr |
| 2016/0292680 A1 | 10/2016 | Wilson, Jr. |
| 2016/0330034 A1 | 11/2016 | Back |
| 2017/0095741 A1* | 4/2017 | Perry ..................... A63F 13/12 |
| 2017/0236360 A1 | 8/2017 | Dewaal |
| 2018/0178125 A1* | 6/2018 | Perry ..................... A63F 13/355 |
| 2019/0282906 A1 | 9/2019 | Yong |
| 2019/0299105 A1 | 10/2019 | Knight |
| 2019/0354945 A1 | 11/2019 | Mahajan |
| 2020/0090143 A1 | 3/2020 | Iervolino |
| 2020/0160320 A1 | 5/2020 | Williams |
| 2020/0202668 A1* | 6/2020 | Cotta .................. G07F 17/3244 |
| 2020/0294133 A1 | 9/2020 | Cella |
| 2020/0311721 A1 | 10/2020 | Ow |
| 2020/0320623 A1 | 10/2020 | McGrath |
| 2021/0052981 A1 | 2/2021 | Yi |
| 2021/0106920 A1* | 4/2021 | Lim ....................... H04L 65/40 |
| 2022/0266149 A1 | 8/2022 | Linden |
| 2022/0266151 A1 | 8/2022 | Koch |
| 2022/0280874 A1 | 9/2022 | Koch |

OTHER PUBLICATIONS

Wood, Mike, "Howto Leave Feedback on Ebay",—(https://www.youtube.com/watch?v=EIY1uTuAixA), May 25, 2017 (Year: 2017).

RockstarFlipper, "Ebay for Beginners, Episode #5. Top Rated Seller & Feedback"—(https://www.youtube.com/watch2v6tk9sZ95ZW8), Mar. 19, 2017 (Year: 2017).

Wood, Mike, "How to Leave Feedback on Ebay"—(https://www.youtube.com/watch?v=EIYiuTuAixA),May 25, 2017 (Year: 2017).

* cited by examiner

SYSTEMS AND METHODS FOR TOKENIZING AND SHARING MOMENTS IN A GAME

FIELD OF THE DISCLOSURE

The present disclosure relates to systems and methods for tokenizing and sharing moments in a game, for a game played in an online gaming platform.

BACKGROUND

Online gaming platforms are known. Selling digital in-game assets to the users of online gaming platforms is known.

SUMMARY

One aspect of the present disclosure relates to a system configured for tokenizing moments in a game, wherein the game can be played in an online gaming platform. The system may include electronic storage, one or more hardware processors, and/or other components. The electronic storage may be configured to electronically store information. The one or more hardware processors may be configured by machine-readable instructions to perform certain functions and/or embody certain elements. A processor may create an asset that represents a set of rights pertaining to an occurrence of a given moment in the game. The given moment includes a transition from a first user game state to a second user game state that has occurred to a given user-controlled character. The set of rights includes a first right to a first type of usage of the asset. A processor may record ownership of the asset as being owned by a first player. A processor may receive a request for using the asset according to the first type of usage. The request is received from the first player. Approval of the request requires ownership of the first right. A processor may verify whether the first player owns the first right as requested. Responsive to the first player owning the first right, a processor may create a presentation of the game as requested, and present the presentation to the first player. A processor may transfer the ownership of the asset to a second player. A processor may record the ownership of the asset as being owned by the second player. A processor may receive a second request for using the asset according to the first type of usage. The second request is received from the first player. Approval of the second request requires ownership of the first right. A processor may verify whether the first player owns the first right as requested in the second request. Responsive to the first player not owning the first right, a processor may deny the second request. A processor may receive a third request for using the asset according to the first type of usage. The third request is received from the second player. The processor may verify whether the second player owns the first right as requested in the third request. Responsive to the second player owning the first right, a processor may create a second presentation of the game as requested in the third request, and present the second presentation to the second player.

Another aspect of the present disclosure related to a method for tokenizing moments in a game. The method may include creating an asset that represents a set of rights pertaining to an occurrence of a given moment in the game. The given moment may include a transition from a first user game state to a second user game state that has occurred to a given user-controlled character. The set of rights may include a first right to a first type of usage of the asset. The method may include recording ownership of the asset as being owned by a first player. The method may include receiving a request for using the asset according to the first type of usage. The request is received from the first player. Approval of the request requires ownership of the first right. The method may include verifying whether the first player owns the first right as requested. The method may include, responsive to the first player owning the first right, creating a presentation of the game as requested, and presenting the presentation to the first player. The method may include transferring the ownership of the asset to a second player. The method may include recording the ownership of the asset as being owned by the second player. The method may include receiving a second request for using the asset according to the first type of usage. The second request is received from the first player. Approval of the second request requires ownership of the first right. The method may include verifying whether the first player owns the first right as requested in the second request. The method may include, responsive to the first player not owning the first right, denying the second request. The method may include receiving a third request for using the asset according to the first type of usage. The third request is received from the second player. The method may include verifying whether the second player owns the first right as requested in the third request. The method may include, responsive to the second player owning the first right, creating a second presentation of the game as requested in the third request and presenting the second presentation to the second player.

As used herein, any association (or relation, or reflection, or indication, or correspondency) involving servers, processors, client computing platforms, assets, rights, types of usage, ownership, instructions, operations, user game states, steps, ownership, requests, verifications, presentations, sales, transfers, notifications, blockchains, approvals, denials, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
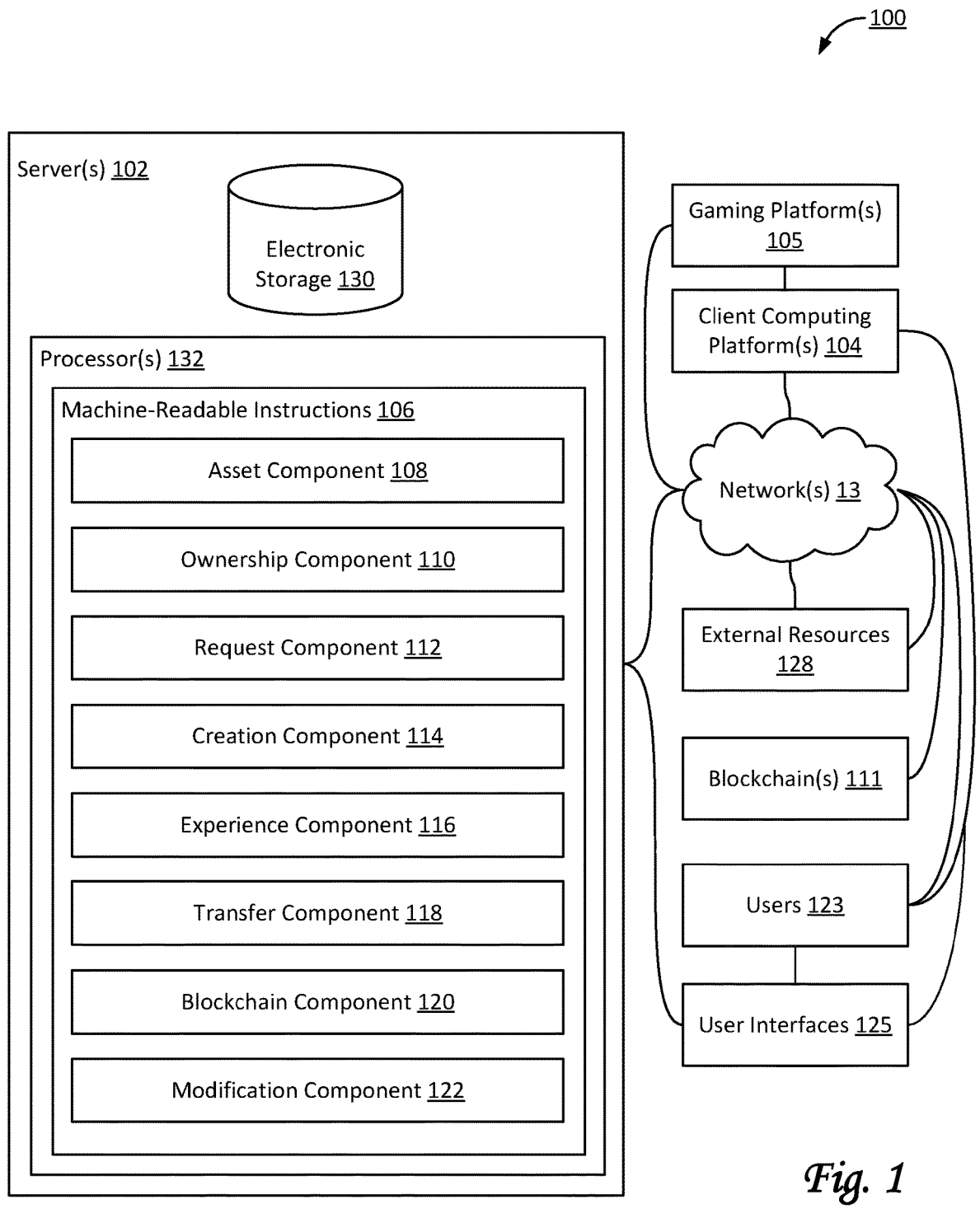
FIG. 1 illustrates a system configured for tokenizing moments in a game, in accordance with one or more implementations.

FIG. 1 illustrates a system 100 configured for tokenizing and sharing moments in a game, for a game played in one or more gaming platforms 105 (e.g., an online gaming platform), in accordance with one or more implementations. In some implementations, system 100 may include one or more of electronic storage 130, one or more servers 102, one or more client computing platforms 104, one or more gaming platforms 105, one or more blockchains 111, one or more external resources 128, and/or other components.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users 123 may access system 100 via client computing platform(s) 104. Users 123 (also referred to as players) may include one or more of a first user, a second user, a third user, a fourth user, and/or other users.

In some implementations, system 100 and/or servers 102 may be configured to communicate with one or more of (online) gaming platform(s) 105, users 123, blockchain(s) 111, and/or other components. As used herein, gaming platform 105 may refer to either an individual game, a type of gaming console and its ecosystem, and/or both. Gaming platform 105 may be operated, hosted, and/or owned by a stakeholder of gaming platform 105. Users 123 may include players who play on gaming platform 105. In some implementations, gaming platform 105 may include an online store that sells and/or otherwise transfers (in-game) virtual items that may be used within gaming platform 105.

As used herein, the term "game state" may refer to some or all of the variables that define the progress and/or status of a player and/or the player's account within an online gaming platform, e.g., gaming platform 105. In some implementations, a given game state may include information that defines context and/or status of a game and/or an online gaming platform. For example, in some implementations, users may save the current game state to preserve their progress (e.g., in a given level or mission of a game), and load the saved game state at a future time to restore their progress and/or status as if they had taken no actions after the moment of saving their game state and/or the game had been somehow frozen in time. For example, whatever items or health were lost after the moment of saving the game state would be restored upon loading the saved game state. In some implementations, users may save and/or restore game state at particular save points and/or restore points. In some implementations, save points and/or restore points may be specific locations within a virtual space of an online game such as, for example, the beginning of a level, mission, and/or battle.

As used herein, the term "user game state" may refer to some or all of the variables that define the position of the user (or a user-controlled character) at a particular moment within an online gaming platform (e.g., gaming platform 105), such as a location within a virtual space of an online game. In some implementations, a given user game state may include information that defines context and/or status of a game and/or an online gaming platform. The user game state at the current time may be referred to as the current user game state. In some implementations, a current position may include a heading and/or direction of the user or the user-controlled character. In some implementations, a current position may include the posture of the user-controlled character, such as, e.g., laying down, sitting, standing, etc. In some implementations, a current position may include the position of one or more body parts of the user and/or the user-controlled character, such as, e.g., the position of feet, legs, arms, wings, etc. In some implementations, a current position may include a velocity and/or acceleration of the user or the user-controlled character. In some implementations, the context and/or status defined in information included in a given user game state may include positions of other users and/or elements within the game at the particular moment such as, by way of non-limiting example, the positions of different vehicles during a race, the positions of different players during a battle/match, the positions of enemies and/or obstacles during a challenge/mission, and so forth.

An in-game action, an operation taken and/or performed by an individual user, and/or a passage of time (even when no action is explicitly taken by a player) may advance the current user game state of an individual player to a subsequent user game state of the individual player. For example, a particular user-controlled character controlled by an individual player may be at a location with coordinates (X0, Y0) within a virtual space. This location may be part of the current user game state of the individual player and/or the particular user-controlled character. By taking a step in a particular direction, the subsequent user game state of the individual player and/or the particular user-controlled character may include, define, and/or otherwise be associated with a subsequent location having coordinates (X1, Y1) within the virtual space. Next, by taking another step in a particular direction, the next user game state may be associated with the next location having coordinates (X1, Y2) within the virtual space. Individual user game states may be associated with one or more types of different timing information. For example, the user game state associated with coordinates (X0, Y0) may be associated with a timestamp of t=0, the user game state associated with coordinates (X1, Y1) may be associated with a timestamp of t=1, the user game state associated with coordinates (X1, Y2) may be associated with a timestamp of t=2, and so forth. In some implementations, timestamps do not need to increment by the same amount. For example, if the individual player had waited to the take the next step described above, the user game state associated with coordinates (X1, Y2) may have been associated with a timestamp of t=5.

In some implementations, system 100 and/or one or more components of system 100 may be configured to execute an instance of a game (e.g., an online game) to facilitate presentation of the game to users 123, and/or to implement in-game actions in the instance of the game, e.g., in response to action requests for the in-game actions by users 123. The game may be provided via a virtual space, and may include a plurality of resource types and/or maps. An instance of the virtual space may be executed by one or more computer components to determine views of the virtual space. In some implementations, the view may be communicated (e.g., by streaming, via object/position data, and/or other information) from server(s) 102 and/or other sources to client computing platforms 104 for presentation to users 123. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. In some implementations, one or more view parameters may be selectable by a user.

The instance of the virtual space may include a simulated space that is accessible by users 123 by clients (e.g., client computing platforms 104) that present the views of the virtual space to a user. The simulated space may have a topography, express ongoing real-time interaction by one or more users, and/or include one or more objects positioned within the topography that are capable of locomotion and/or movement within the topography. In some implementations, the topography may be a 2-dimensional topography. In some implementations, the topography may be a 3-dimensional topography. The topography may include dimensions of the simulated space, and/or surface features of a surface or objects that are native to the simulated space. In some implementations, the topography may include a surface (e.g., a ground surface) that runs through at least a substantial section of the simulated space. In some implementations, the topography may describe a volume with one or more bodies positioned therein. The instance executed by the computer components may be synchronous, asynchronous, and/or semi-synchronous.

Within the instance of the virtual space, users 123 may control characters, objects, simulated physical phenomena, and/or other elements within the virtual space to interact with the virtual space and/or each other. The user characters may include avatars. As used herein, the term "user character" may refer to an object or group of objects present in the virtual space, that correspond(s) to an individual user. A particular user character may be controlled by the particular user with which it is associated. Such user characters may be referred to as user-controlled characters. User-controlled element(s) may move through and interact with the virtual space (e.g., non-user characters in the virtual space, other objects in the virtual space, etc.). User-controlled elements controlled by and/or associated with a given user may be created and/or customized by the given user. Individual users may have an "inventory" of virtual goods and currency (e.g., resources of the plurality of resource types) that the individual user can use (e.g., by manipulation of a user character and/or other user-controlled elements) and/or other items, to perform in-game actions within the virtual space.

In some implementations, system 100 may include a (distributed) blockchain that may be maintained by a distributed computing platform (not shown in FIG. 1). In some implementations, the distributed computing platform may be implemented by a set of client computing platforms and/or servers. The distributed computing platform may support a virtual machine (not shown in FIG. 1). The distributed computing platform and/or the virtual machine may form a runtime environment for smart contracts and/or other executable code. In some implementations, the distributed computing platform may include electronic storage configured to store part or all of blockchain(s) 111. The smart contracts may be stored on blockchain(s) 111. In some implementations, the distributed computing platform may be the EOSIO platform. In some implementations, the distributed computing platform may be Ethereum. In some implementations, the distributed computing platform may be similar to Ethereum. In some implementations, the virtual machine may be a decentralized virtual machine.

A distributed blockchain may act as a (decentralized) database that stores a registry and/or ledger of assets and transactions across one or more networks. In some implementations, a ledger may be implemented as a database. For example, a blockchain is a type of ledger, as well as a type of decentralized database that stores a registry of assets and transactions. A given asset may be owned by a particular user. An asset may include anything of material value or usefulness that is owned by or on behalf of a person or company, including but not limited to assets created by asset component 108, and/or other assets. In some implementations, a right pertaining to an object may be an asset, the object being a physical or a virtual item. Multiple rights may form a set of rights or a bundle of rights that may be transferred and/or otherwise acted on or operated on together. For example, rights may include a right to use, a right to sell, a right to destroy, and/or other rights.

In some implementations, tokens may be a type of asset. In some implementations, tokens may include one or more of security tokens, utility tokens, payment tokens, initial coin offering (ICO) tokens, virtual currency tokens, crypto tokens, ERC-20 tokens, EOS tokens, and/or other tokens. In some implementations, tokens not only represent value, but may have a specific use in a particular distributed computing platform, e.g., in the operation of blockchain 111.

In some implementations, blockchain(s) 111 may record and/or register ownership of assets. Alternatively, and/or simultaneously, blockchain(s) 111 may register transactions that modify ownership of assets. A smart contract may be a type of asset. In some implementations, once a smart contract has been added to a blockchain, the smart contract may be referred to as published, posted, registered, and/or recorded. Elements of blockchain(s) 111 may be grouped together in units that are referred to as blocks. For example, an individual block may include one or more assets and one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more assets, one or more transactions, and/or other information.

In some implementations, blockchain(s) 111 may be publicly accessible and append-only. In some implementations, existing blocks of a distributed blockchain can substantially not be altered or deleted, unless multiple copies of the distributed blockchain are altered. This is unlikely to happen provided that multiple copies of the distributed blockchain are stored on different computing platforms, e.g., in different geographical locations. The distributed blockchain may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, transactions, and/or assets may be digitally signed in a manner that prevents tampering, e.g., by providing authentication.

Server(s) 102 may be configured by machine-readable instructions 106. Machine-readable instructions 106 may include one or more instruction components. The instruction components may include computer program components. The instruction components may include one or more of asset component 108, ownership component 110, request component 112, creation component 114, experience component 116, transfer component 118, blockchain component 120, modification component 122, and/or other instruction components.

Asset component 108 may be configured to create assets. The assets may include a first asset, a second asset, a third asset, and so forth. The assets may represent certain rights, e.g. a set of rights. Individual rights may pertain to occurrences of moments in a game that is played in online gaming platform 105. In some implementations, individual moments may include transactions between different user game states. The different user game states may have occurred and/or otherwise happened to different players and/or their user-controller characters in the game. For example, a given moment may include a transition from a first user game state to a second user game state. In some implementations, a set of rights as represented by an individual asset may include one or more rights to one or more different types of usage of the individual asset. For example, a given set of rights may include a first right, a second right, a third right, and so on. For example, the first right may be a right to a first type of usage of the individual asset, the second right may be a right to a second type of usage of the individual asset, the third right may be a right to a third type of usage of the individual asset, and so on. In some implementations, assets may be managed by online gaming platform 105, blockchain 111, and/or other components of system 100. For example, in some implementations, a given asset may be included in (or accessible through) a user inventory of a user of online gaming platform 105. For example, in some implementations, a given asset may be recorded on (or accessible through) blockchain 111.

In some implementations, the rights to different types of usage that may be represented in an individual asset may include a right to (re)play video information (i.e., information including one or more of audio content, visual content, and/or animated content) that has been (or could have been) captured at the occurrence of a given moment (e.g., as it occurred to an original user-controlled character in the given moment), including but not limited to pre-rendered visual content. For example, the video information may depict the occurrence of the given moment in the game (as occurring to the original user-controlled character). For example, the given moment may be the winner of a competition receiving a medal and/or other award. Replaying the video that depicts this given moment may require ownership of the individual asset. In some implementations, only the owner of the individual asset may be able to replay this video (and this owner may be a different player than the winner). In other words, the player that originally experienced the given moment may be excluded from one or more rights to one or more types of usage pertaining to the occurrence of this given moment (such as, for example, the right to play a video that depicts the given moment). In some implementations, this type of usage may be not interactive, in that the owner cannot alter the main transition included in the given moment. In some implementations, the owner may be able to modify one or more visual parameters such as camera angles, points-of-view, changes in ambient lighting, time-of-day, weather patterns, and/or other modifications that change the depiction upon replay of the video, without altering the main transition included in the given moment. In some implementations, this type of usage may include sharing and/or posting the video information, e.g., on social media. In some implementations, this right may be referred to as the first right. In some implementations, this type of usage may be referred to as the first type of usage.

In some implementations, the rights to different types of usage that may be represented in an individual asset may include another right to playback video information based on captured game information, such that, when played, the video information depicts an occurrence of a given moment in the game as if it occurred (or is occurring) to a particular user-controlled character that is different from the original user-controlled character. For example, assuming the individual asset is owned by a given player, the played video information may depict the given moment occurring to the particular user-controlled character that is usually controlled by the given player. For example, the given moment may be a competitor in a race crossing the finish-line just ahead of another character. The played video may depict the given player crossing the finish-line just ahead of another character, as if the given player was a competitor in this race. In some implementations, this type of usage may be not interactive, in that the owner cannot alter the main transition included in the given moment, even though the owner may cause other modifications that change the depiction of the video, without altering the main transition included in the given moment. In some implementations, this right may be referred to as the second right. In some implementations, this type of usage may be referred to as the second type of usage.

Figure 3A:
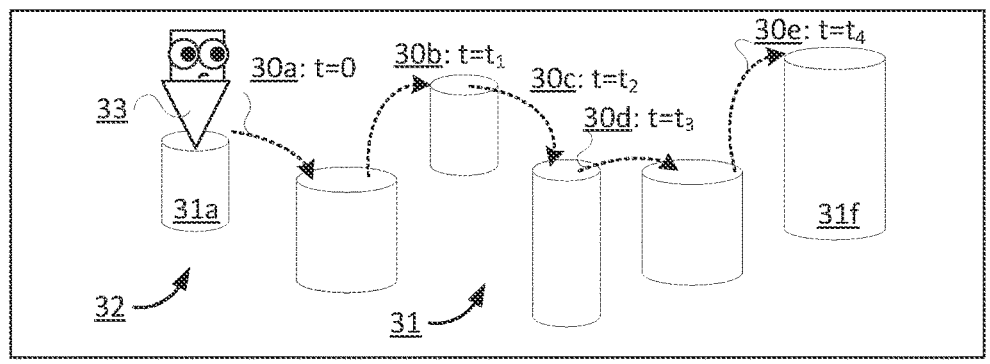
FIGS. 3A-3B illustrate an occurrence of a given moment in a game that may be played by a player controlling a user-controlled character, as may be used in a system configured for tokenizing moments in a game, in accordance with one or more implementations.
Figure 3B:
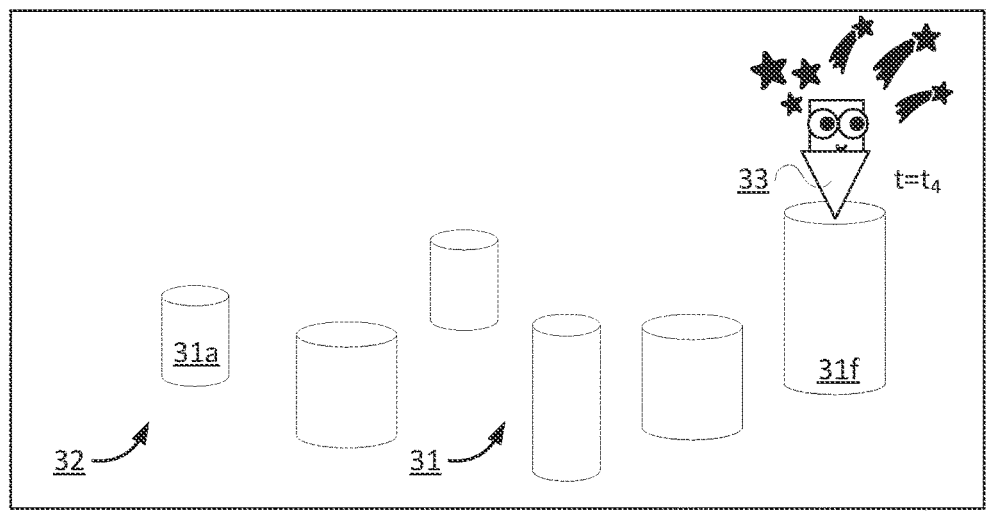

By way of non-limiting example, FIG. 3A and FIG. 3B illustrates an occurrence of a moment 32 in a game played by (user-controlled) in-game character 33 in a topography 31. Moment 32 may include a transition from a first user game state (depicted in FIG. 3A) to a second user game state (depicted in FIG. 3B). Topography 31 includes a set of objects, including a first object 31*a*, and a sixth object 31*f*. Subsequent to the first user game state, in-game character 33 may perform in-game operation 30*a* (here, at timestamp t=0), in-game operation 30*b* (here, at timestamp t1), in-game operation 30*c* (here, at timestamp t2), in-game operation 30*d* (here, at timestamp t3), and in-game operation 30*e* (here, at timestamp t4), to arrive at the second user game state depicted in FIG. 3B, with in-game character 33 at the top of sixth object 31*f* (celebrating the accomplishment of reaching this location, for example).

Referring to FIG. 1, in some implementations, the rights to different types of usage that may be represented in an individual asset may include yet another right to replay the game interactively. The replay may be based on captured game information, such that the replay may depict an occurrence of a given moment in the game as if is occurring to the original user-controlled character, but while the original user-controlled character is controlled by the owner of the individual asset. If the given moment includes a transition from a first user game state to a second user game state, the replay may include a user game state that is the same as or similar to the first user game state, and a player may interactively control the original user-controlled character (or a character similar to that character) in an effort to transition to a subsequent user game state that is the same as or similar to the second user game state. For example, the given moment may be a star soccer-player in a championship game taking a last-second free kick to win the match. The owner may interactively control the original user-controlled character (here, the star soccer-player) and attempt to make the same or a similar free kick. In some implementations, this type of usage may be interactive, in that the owner controls whether the main transition included in the given moment occurs again (or whether a similar transition occurs). In some implementations, this right may be referred to as the third right. In some implementations, this type of usage may be referred to as the third type of usage.

In some implementations, the different types of rights that may be represented in an individual asset may include yet another right to (re)play the game interactively, based on captured game information. The replay may depict an occurrence of a given moment in the game as it is occurring to a particular user-controlled character that is different from the original user-controlled character. For example, the replay may depict the given moment occurring to the particular user-controlled character that is usually controlled by the owner of the individual asset. If the given moment includes a transition from a first user game state to a second user game state, the replay may include a user game state that is the same as or similar to the first user game state, and a player may interactively control the particular user-controlled character in an effort to transition to a subsequent user game state that is the same as or similar to the second user game state. For example, the given moment may be taking the last shot that kills the boss at the end of a difficult mission. The replay may start just before the original user-controlled character took this last shot and completed the difficult mission. The owner of the individual asset may interactively control the particular user-controlled character (or any user-controlled character that is available for gameplay to the owner) and attempt to take an action (such as a shot) that kills the boss. In some implementations, one or more attributes, skills, weapons, and/or virtual items that were available to the original user-controlled character when the given moment originally occurred may be made available to the particular user-controlled character used by the owner of the individual asset. This may be needed and/or helpful in making the recreation of this moment possible, or at least more likely. In some implementations, this type of usage may be interactive, in that the owner controls whether the main transition included in the given moment occurs again (or whether a similar transition occurs). In some implementations, this right may be referred to as the fourth right. In some implementations, this type of usage may be referred to as the fourth type of usage.

Figure 3C:
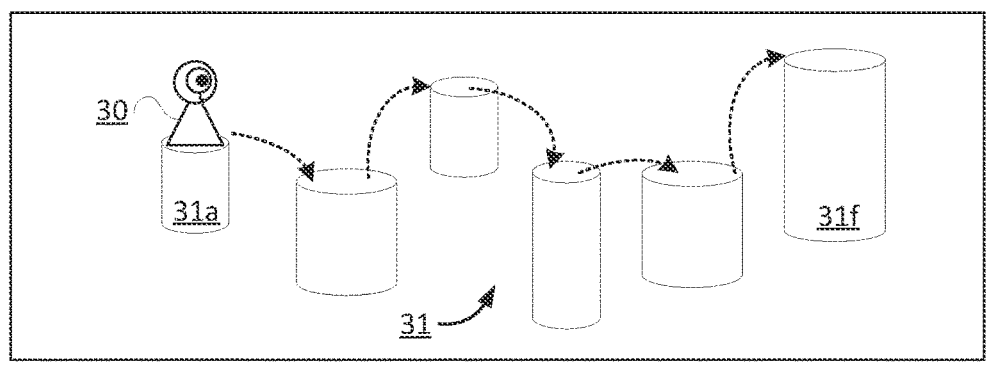
FIGS. 3C-3D illustrate a type of usage of an asset, as may occur in a system configured for tokenizing moments in a game, in accordance with one or more implementations.
Figure 3D:
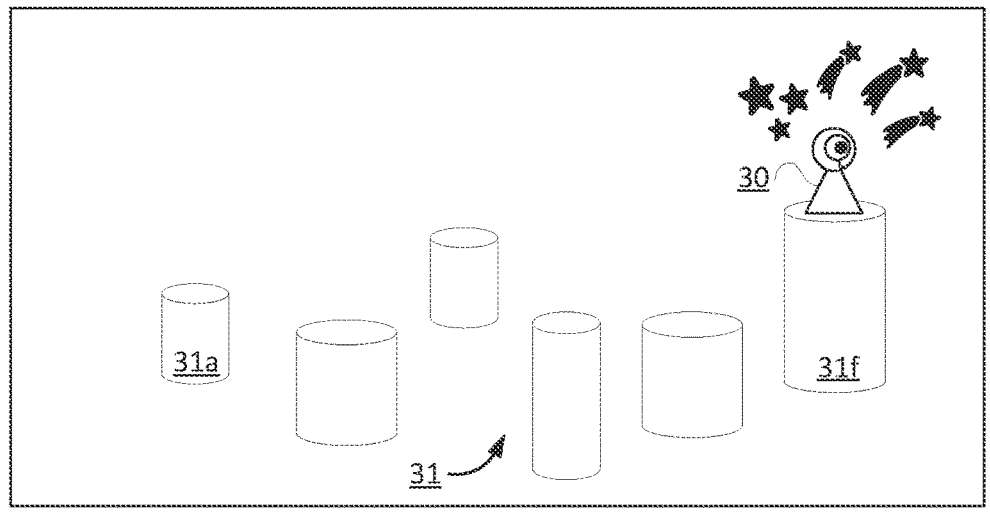

By way of non-limiting example, FIG. 3C and FIG. 3D illustrates a type of usage of an asset that represents a right to interactively replay a particular moment in the game (here, moment 32 of FIGS. 3A-3B). Interactive replay may use (user-controlled) in-game character 30 in a topography 31, starting at a first user game state that is similar as the first user game state of FIG. 3A. The player (who owns the asset) may play the game and attempt to recreate the second user game state depicted in FIG. 3B, by reaching the top of sixth object 31f. Subsequent to the first user game state, in-game character 30 may attempt to perform similar in-game operations as described in relation to FIG. 3A, to arrive at the second user game state depicted in FIG. 3D, with in-game character 30 at the top of sixth object 31f (here, depicted as celebrating the accomplishment of reaching this location, for example).

Referring to FIG. 1, ownership component 110 may be configured to record ownership of assets. For example, ownership may signify a particular relationship between assets and one or more users. In some implementations, ownership may be exclusive, e.g., to one user. In some implementations, ownership component 110 may be configured to verify whether a particular players owns a particular right, e.g., the right as requested in a request received by request component 112. In some implementations, ownership component 110 may be configured to deny a particular request, e.g., responsive to verification of ownership failing. In some implementations, ownership component 110 may (co)operate with one or more other components of system 100 to record and/or verify ownership of assets on blockchain 111, e.g., by analyzing the history of recorded transactions of a particular asset.

Request component 112 may be configured to receive requests from users. The request may pertain to using a given asset according to a given type of usage. For example, a first request from a first user may pertain to using a first asset according to a first type of usage. For example, a second request from a second user may pertain to using a second asset according to a second type of usage, and so forth. The second user may request to use the first asset, the first user may request to use the second asset, and any combination of users requesting to use assets are envisioned within this disclosure. In some implementations, approval of a particular request may require ownership of either the asset in question, or the particular right of usage as requested. In some implementations, approval of a particular request may be conditioned on one or more requirements, including, but not limited to, requirements pertaining to the requesting user, the asset in question, or the particular right of usage as requested. In some implementations, a particular request can only be made responsive to the requesting player having ownership of either the asset in question, or the particular right of usage as requested. In some implementations, a request may be implicit and/or implied by an action of a player, such as entering and/or selecting user input pertaining to using a given asset according to a given type of usage. In some implementations, request component 112 may be configured to determine one or more verifications related to a request, including but not limited to verifications of the one or more requirements. For example, in some implementations, request component 112 may be configured to deny a particular request, e.g., responsive to one or more of the verifications failing.

Creation component 114 may be configured to create presentations, e.g., of the game. In some implementations, creation component 114 may be configured to create presentations as requested. For example, if a request by a particular player is to use an individual asset according to a first type of usage, the created presentation may include a video that can be played by the particular player, as described above. For example, if a request is to use an individual asset according to a third type of usage, the created presentation may include an interactive version of the game that the particular player can replay and/or control, as described above. The created presentation may include a user game state that is the same as or similar to the first user game state of the individual asset, and the particular player may interactively control the original user-controlled character (or a character similar to that character) in an effort to transition the user game state to a subsequent user game state that is the same as or similar to the second user game state of the individual asset. In some implementations, actions performed by creation component 114 may occur responsive to particular results for particular verifications (e.g., a verification regarding ownership of the request-specific individual assets). In some implementations, presentations may be referred to as experiences.

Experience component 116 may be configured to present presentations and/or experiences to users. For example, experience component 116 may be configured to present presentations as created by creation component 114. In some implementations, experience component 116 may be configured to effectuate presentations being presented to users, e.g. through client computing platforms 104, user interfaces 125, gaming platforms 105, and/or other components of system 100. In some implementations, actions performed by experience component 116 may occur responsive to particular results for particular verifications (e.g., a verification regarding ownership of the request-specific individual assets).

Transfer component 118 may be configured to transfer assets between users. In some implementations, transfer component 118 may be configured to transfer ownership of assets, for example from one player to another player. In some implementations, transfer component 118 may be configured to modify ownership of a particular asset as previously recorded to reflect a transfer of the particular asset to a new owner. In some implementations, operations by transfer component 118 may occur responsive to a purchase. For example, a second player may purchase a given asset from a first player. Responsive to such a purchase, the given asset may be transferred to the second player by transfer component 118. In some implementations, completion of purchases may include recording of transactions on blockchain 111.

Blockchain component 120 may be configured to perform actions on blockchain 111, including but not limited to recording transactions/transfers of assets, recording and/or verifying ownership of assets, recording modifications in ownership, analyzing ownership of particular assets (e.g., through the history of recorded transactions), and/or other actions. For example, in some implementations, ownership component 110 may use one or more functions provided by blockchain component 120 to perform one or more of the actions and/or features attributed to ownership component 110, including but not limited to recording and/or verifying ownership of particular assets. For example, in some implementations, assets may be implemented as smart contracts on blockchain 111. A verification of asset-ownership may accordingly be implemented as a function on a particular smart contract. Moreover, a transfer of ownership may be implemented by recording and/or storing an address (that identifies the new owner of a particular asset) to blockchain 111 and/or the particular smart contract.

Figure 4A:
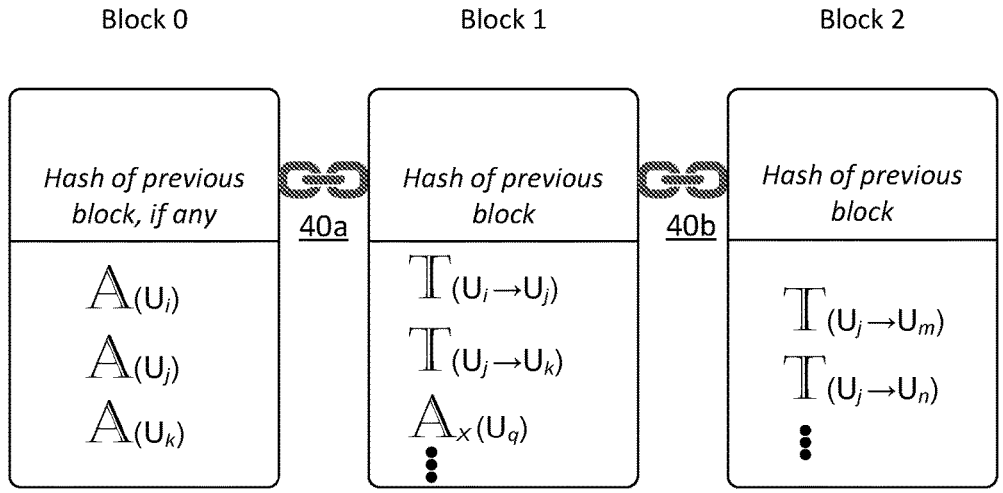
FIGS. 4A-4B illustrate exemplary blockchains as may be used by a system configured for tokenizing moments in a game, in accordance with one or more implementations.

By way of non-limiting example, FIG. 4A illustrates a blockchain 111a that implements a blockchain including a block 0, a block 1, and a block 2. As time progresses, more blocks may be added to blockchain 111a. The blocks within blockchain 111a are ordered. As shown in block 0, three assets (indicated by a capital "A") are created and/or generated, and subsequently assigned to three users or players: a first asset is assigned to user i (Ui), a second asset is assigned to user j (Uj), and a third asset is assigned to user k (Uk). As used in the context of blockchains, assignments may be recordations of ownership. These assets may be individually manifested, deployed, and/or instantiated through an asset component similar to asset component 108 (see FIG. 1). Block 1 is connected to block 0 (as indicated by a link 40a), for example by including an address of block 1 in block 0, or vice versa. Likewise, block 1 is connected to block 2, as indicated by a link 40b.

In block 1, one asset (labeled Ax) is assigned to user q (Uq), for example by associating an address of user q to asset Ax. For example, the asset in block 1 may be an individual asset created by an asset component similar to asset component 108 (see FIG. 1). Asset Ax may represent a set of rights pertaining to an occurrence of a given moment in a game that occurred on gaming platform 105 (not shown). Additionally, block 1 includes two transactions (indicated by a capital "T"): a first transaction from user i to user j, and a second transaction from user j to user k. Block 2 includes a first transaction from user j to user m, and a second transaction from user j to user n. In some implementations, based on the contents of the blocks, any user of blockchain 111a may determine the current assets of blockchain 111a, and the balances of any user. In some implementations, the balance of a particular user may be verified prior to adding a transaction that reduces that particular user's balance. For example, an individual user may not be allowed to transfer assets the individual user does not own.

Figure 4B:
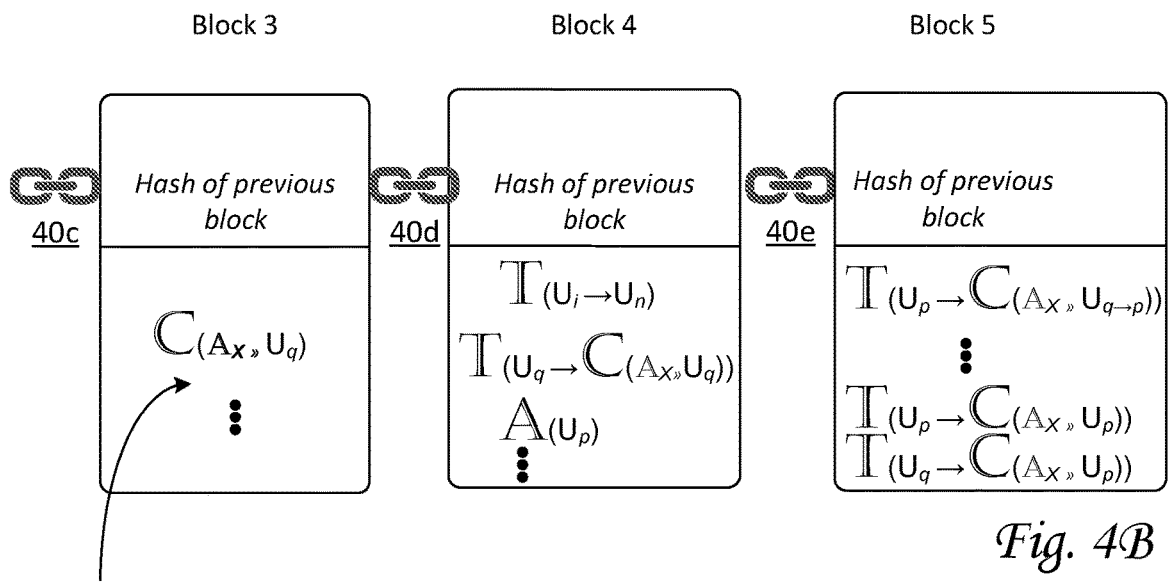

By way of non-limiting example, FIG. 4B illustrates a blockchain 111b that includes the same blocks as blockchain 111a of FIG. 4A, plus additional blocks (block 3, block 4, block 5) that have been appended to the blockchain. Block 3 may be connected to block 2 (as indicated by a link 40c), block 4 may be connected to block 3 (as indicated by a link 40d), and block 5 may be connected to block 4 (as indicated by a link 40e). In block 3, a smart contract 41 (indicated by a capital "C") is posted. For example, smart contract 41 may have been generated to aid or implement different types of usage of asset Ax (and/or other actions related to asset Ax). In FIG. 4B, a function call to a function defined by smart contract 41 (e.g., to request a particular type of usage of asset Ax) may be depicted and/or implemented as a transaction (e.g., the function may be invoked in exchange for consideration). In some implementations, smart contract 41 may have been posted to blockchain 111b by (or on behalf of) an owner or creator of asset Ax. Referring to FIG. 4B, for example, smart contract 41 may include or refer to asset Ax and record that asset Ax is currently owned by user q (Uq). In block 4, one asset is assigned to user p (Up). Additionally, block 4 includes a transaction (indicated by a capital "T"): a transaction from user i to user n. For example, the transaction may represent a purchase of a first virtual item by user n. Additionally, block 4 includes a transaction from user q to the same smart contract as depicted in block 3. For example, the transaction may represent user q requesting a particular usage of asset Ax (this is the first request). Block 5 includes three transactions (indicated by a capital "T"): a first transaction representing a transfer of ownership of asset Ax from old owner user q to new owner user p. A second transaction may represent user p requesting another particular usage of asset Ax (this is the second request). A third transaction may represent user q requesting a particular usage of asset Ax (this is the third request). For example, the first request (responsive to the transaction in block 4) may be granted, since the requesting user is the owner of asset Ax (here, user q). For example, the second request (responsive to a transaction in block 5) may be granted, since the requesting user is the new owner of asset Ax (here, user p). For example, the third request (responsive to a transaction in block 5) may be denied, because the requesting user q is no longer the owner of asset Ax after the transfer transaction in block 5.

Referring to FIG. 1, modification component 122 may be configured to modify user-controlled characters and/or presentations of user-controlled characters within gaming platform 105. In some implementations, modifications by modification component 122 may occur responsive to verifications regarding ownership of particular individual assets. In some implementations, the modification may include a visual element that other players in the game can readily distinguish, assuming they are knowledgeable of this modification mechanism (this visual element may also be referred to as a visual distinction). In some implementations, the modification may be such that players can only be modified in this manner if they are the owner of a particular right or asset. For example, in some implementations, the modification may include a visually distinctive deformity or scar. For example, in some implementations, the modification may include a visually distinctive embellishment of a weapon or other virtual item (e.g., etching a skull into a weapon). For example, in some implementations, the modification may include a trophy, patch, medal, armor, and/or other virtual item that signifies to knowledgeable players in the game that the owner of such a modification either has experienced a particular moment in the game, or owns the corresponding asset or rights thereof as described in this disclosure, or both. In some implementations, modifications by modification component 122 may be reversible. For example, a first player may have a visually distinctive modification (e.g., to a particular weapon) as long as the first player owns a particular asset. As soon as the first player sells the particular asset to a second player, the visually distinctive modification of the first player (here, the particular weapon) may be reverted. For example, the second player may then have a (similar or different) visually distinctive modification (e.g., an embellishment of a different weapon, a distinctive scar, a striped tail, a third eye, etc. etc.).

In some implementations, server(s) 102, client computing platform(s) 104, and/or external resources 128 may be operatively linked via one or more electronic communication links. For example, such electronic communication links may be established, at least in part, via one or more networks 13, including but not limited to the Internet and/or other networks. It will be appreciated that this is not intended to be limiting, and that the scope of this disclosure includes implementations in which server(s) 102, client computing platform(s) 104, and/or external resources 128 may be operatively linked via some other communication media.

A given client computing platform 104 may include one or more processors configured to execute computer program components. The computer program components may be configured to enable an expert or user associated with the given client computing platform 104 to interface with system 100 and/or external resources 128, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a smart watch, a gaming console, and/or other computing platforms.

External resources 128 may include sources of information outside of system 100, external entities participating with system 100, and/or other resources. For example, in some implementations, external resources 128 may include a sales platform through which assets may be purchased and sold between different users. In some implementations, some or all of the functionality attributed herein to external resources 128 may be provided by resources included in system 100.

Server(s) 102 may include electronic storage 130, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, and/or 122, and/or other components. Processor(s) 132 may be configured to execute components 108, 110, 112, 114, 116, 118, 120, and/or 122, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, and/or 122 are illustrated in FIG. 1 as being implemented within a single processing unit, in implementations in which processor(s) 132 includes multiple processing units, one or more of components 108, 110, 112, 114, 116, 118, 120, and/or 122 may be implemented remotely from the other components. The description of the functionality provided by the different components 108, 110, 112, 114, 116, 118, 120, and/or 122 described below is for illustrative purposes, and is not intended to be limiting, as any of components 108, 110, 112, 114, 116, 118, 120, and/or 122 may provide more or less functionality than is described. For example, one or more of components 108, 110, 112, 114, 116, 118, 120, and/or 122 may be eliminated, and some or all of its functionality may be provided by other ones of components 108, 110, 112, 114, 116, 118, 120, and/or 122. As another example, processor(s) 132 may be configured to execute one or more additional components that may perform some or all of the functionality attributed below to one of components 108, 110, 112, 114, 116, 118, 120, and/or 122.

Figure 2:
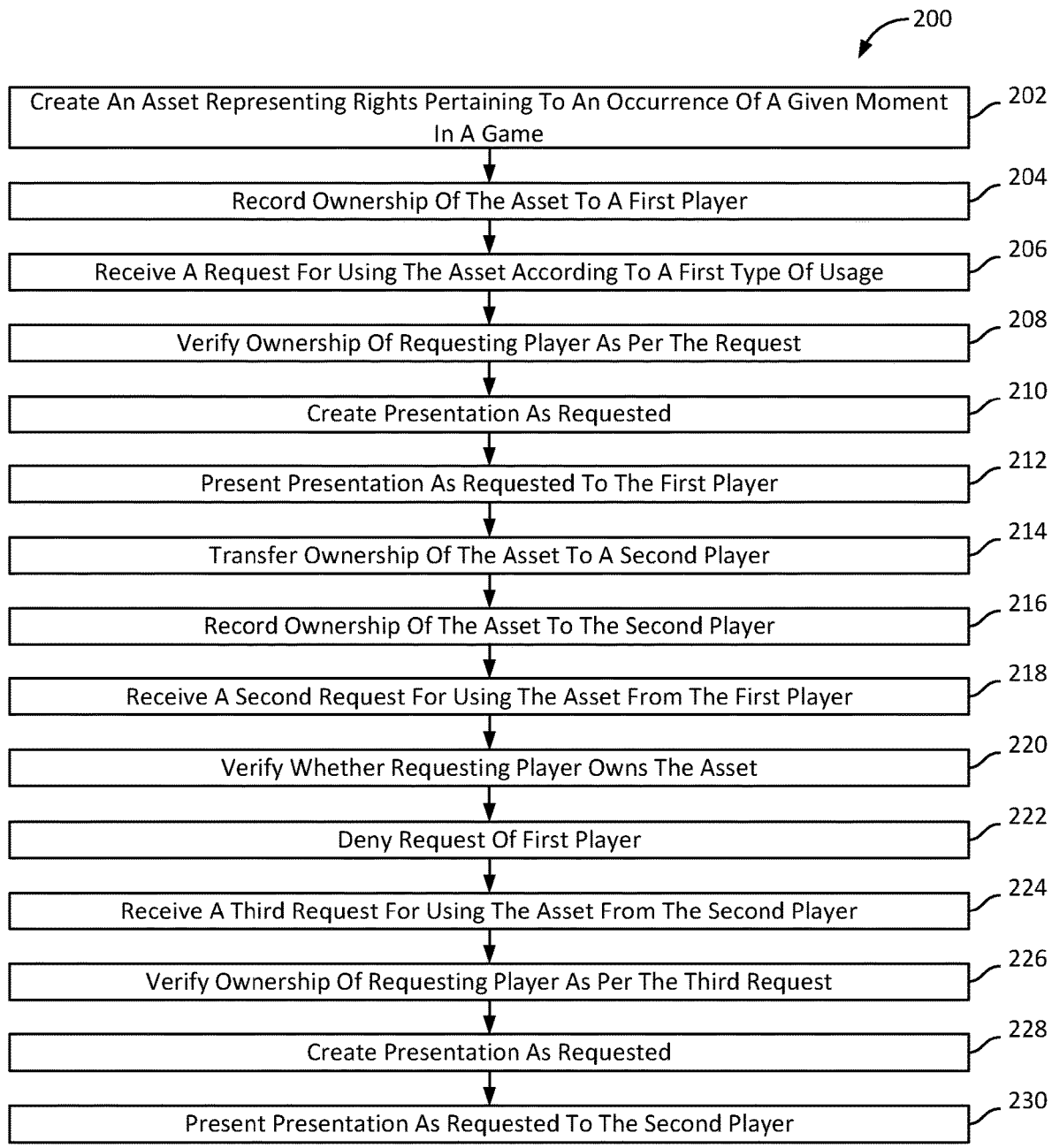
FIG. 2 illustrates a method for tokenizing moments in a game, in accordance with one or more implementations.

FIG. 2 illustrates a method 200 for tokenizing moments in a game, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an asset is created that represents a set of rights pertaining to an occurrence of a given moment in the game. The given moment includes a transition from a first user game state to a second user game state that has occurred to a given user-controlled character. The set of rights includes a first right to a first type of usage of the asset. In some embodiments, operation 202 is performed by an asset component the same as or similar to asset component 108 (shown in FIG. 1 and described herein).

At an operation 204, ownership of the asset is recorded as being owned by a first player. In some embodiments, operation 204 is performed by an ownership component the same as or similar to ownership component 110 (shown in FIG. 1 and described herein).

At an operation 206, a request is received for using the asset according to the first type of usage. The request is received from the first player. Approval of the request requires ownership of the first right. In some embodiments, operation 206 is performed by a request component the same as or similar to request component 112 (shown in FIG. 1 and described herein).

At an operation 208, whether the first player owns the first right as requested is verified. In some embodiments, operation 208 is performed by an ownership component the same as or similar to ownership component 110 (shown in FIG. 1 and described herein).

At an operation 210, responsive to the first player owning the first right, a presentation of the game as requested is created. In some embodiments, operation 210 is performed by a creation component the same as or similar to creation component 114 (shown in FIG. 1 and described herein).

At an operation 212, responsive to the first player owning the first right, the presentation is presented to the first player. In some embodiments, operation 212 is performed by an experience component the same as or similar to experience component 116 (shown in FIG. 1 and described herein).

At an operation 214, the ownership of the asset is transferred to a second player. In some embodiments, operation 214 is performed by a transfer component the same as or similar to transfer component 118 (shown in FIG. 1 and described herein).

At an operation 216, the ownership of the asset is recorded as being owned by the second player. In some embodiments, operation 216 is performed by an ownership component the same as or similar to ownership component 110 (shown in FIG. 1 and described herein).

At an operation 218, a second request is received for using the asset according to the first type of usage. The second request is received from the first player. Approval of the second request requires ownership of the first right. In some embodiments, operation 218 is performed by a request component the same as or similar to request component 112 (shown in FIG. 1 and described herein).

At an operation 220, whether the first player owns the first right as requested in the second request is verified. In some embodiments, operation 220 is performed by an ownership component the same as or similar to ownership component 110 (shown in FIG. 1 and described herein).

At an operation 222, responsive to the first player not owning the first right, the second request is denied. In some embodiments, operation 222 is performed by an ownership component the same as or similar to ownership component 110 (shown in FIG. 1 and described herein).

At an operation 224, a third request is received for using the asset according to the first type of usage. The third request is received from the second player. In some embodiments, operation 224 is performed by a request component the same as or similar to request component 112 (shown in FIG. 1 and described herein).

At an operation 226, whether the second player owns the first right as requested in the third request is verified. In some embodiments, operation 226 is performed by an ownership component the same as or similar to ownership component 110 (shown in FIG. 1 and described herein).

At an operation 228, responsive to the second player owning the first right, a second presentation of the game as requested in the third request is created. In some embodiments, operation 228 is performed by a creation component the same as or similar to creation component 114 (shown in FIG. 1 and described herein).

At an operation 230, responsive to the second player owning the first right, the second presentation is presented to the second player. In some embodiments, operation 230 is performed by an experience component the same as or similar to experience component 116 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for tokenizing moments that have occurred in a game, wherein the game is played by users of an online gaming platform, wherein the users include a first player and a second player, wherein the first player controls a first user-controlled character in the game, the system comprising:
  electronic storage configured to electronically store information; and
  one or more hardware processors configured by machine-readable instructions to:
    establish one or more connections between one or more servers and one or more client computing platforms associated with the users, the one or more client computing platforms including a first client computing platform associated with the first player wherein a first connection is established between the one or more servers and the first client computing platform;
    create an asset that represents a set of rights pertaining to an occurrence of a given moment in the game, wherein the given moment includes a transition from a first user game state to a second user game state that has occurred to a given user-controlled character, wherein the set of rights includes a first right to a first type of usage of the asset;
    record, on a distributed ledger, ownership of the asset as being owned by the first player, wherein the distributed ledger is a blockchain;
    receive, via the first client computing platform, a request from the first player for using the asset according to the first type of usage, wherein approval of the request requires the ownership of the asset;
    perform, by the one or more servers, a verification that the first player owns the ownership of the asset as required;
    subsequent to the verification, create a presentation of the game as requested that depicts the asset being used according to the first type of usage;
    present, using the first connection, the presentation to the first player on the first client computing platform;
    transfer the ownership of the asset from the first player to the second player;
    record, on the distributed ledger, the ownership of the asset as being owned by the second player;
    receive, via the first client computing platform a second request from the first player for using the asset according to the first type of usage, wherein approval of the second request requires the ownership of the asset;
    perform a second verification that the first player owns the ownership of the asset as required; and
    responsive to the first player not owning the ownership of the asset, deny the second request.

2. The system of claim 1, wherein the first type of usage of the asset includes replaying video information that has been captured at the occurrence of the given moment in the game, wherein the video information depicts the occurrence of the given moment in the game, wherein presenting the game as requested depicts the video information being replayed.

3. The system of claim 1, wherein the one or more client computing platforms further include a second client computing platform associated with the second player, wherein the set of rights further includes a second right to a second type of usage of the asset, wherein the second type of usage of the asset includes replaying the game interactively from the first user game state to the second user game state as the given user-controlled character, wherein the one or more hardware processors are further configured to:
  receive, via the second client computing platform, a third request from the second player for using the asset according to the second type of usage;
  perform a third verification that the second player owns the second right;
  subsequent to the third verification, create a second presentation of the game as requested in the third request;
  present the second presentation to the second player on the second client computing platform, wherein presenting the second presentation of the game as requested depicts the second player interactively replaying the game from the first user game state to the second user game state as the given user-controlled character.

4. The system of claim 3, wherein the second player controls a second user-controlled character in the game, wherein the set of rights further includes a third right to a third type of usage of the asset, wherein the third type of usage of the asset includes replaying the game interactively from the first user game state to the second user game state as a user-controlled character controlled by a player that is recorded as owning the asset, wherein the one or more hardware processors are further configured to:
  receive, via the second client computing platform, a fourth request from the second player for using the asset according to the third type of usage;
  responsive to the second player owning the asset, create a third presentation of the game;
  present the third presentation to the second player on the second client computing platform, wherein presenting the third presentation of the game as requested depicts the second player interactively replaying the game from the first user game state to the second user game state as the second user-controlled character.

5. The system of claim 1, wherein recording the ownership of the asset is performed through a transaction of a decentralized database that implements a distributed ledger.

6. The system of claim 1, wherein verifying that the first player owns the asset includes analyzing transactions recorded on the blockchain.

7. The system of claim 1, wherein transferring the ownership of the asset to the second player is responsive to a purchase by the second player of the asset, wherein the purchase includes a transaction that is recorded on the blockchain.

8. The system of claim 1, wherein the first type of usage of the asset includes recreating video information based on information that has been captured at the occurrence of the given moment in the game, wherein presenting the game as requested depicts the recreated video information being presented.

9. The system of claim 1, wherein the given user-controlled character is controlled by the first player, and wherein the given moment in the game occurred to the first player.

10. A method for tokenizing moments that have occurred in a game, wherein the game is being played by users of an online gaming platform, wherein the users include a first player and a second player, wherein the first player controls a first user-controlled character in the game, the method comprising:

establishing one or more connections between one or more servers and one or more client computing platforms associated with the users, the one or more client computing platforms including a first client computing platform associated with the first player, wherein a first connection is established between the one or more servers and the first client computing platform;

creating an asset that represents a set of rights pertaining to an occurrence of a given moment in the game, wherein the given moment includes a transition from a first user game state to a second user game state that has occurred to a given user-controlled character, wherein the set of rights includes a first right to a first type of usage of the asset;

recording, on a distributed ledger, ownership of the asset as being owned by the first player, wherein the distributed ledger is a blockchain;

receiving, via the first client computing platform, a request from the first player for using the asset according to the first type of usage, wherein using the asset according to the first type of usage requires the ownership of the asset;

performing, by the one or more servers, a verification that the first player owns the ownership of the asset as required;

subsequent to the verification, creating a presentation of the game that depicts the asset being used according to the first type of usage;

presenting, using the first connection, the presentation to the first player on the first client computing platform;

transferring the ownership of the asset from the first player to the second player;

recording, on the distributed ledger, the ownership of the asset as being owned by the second player;

receiving, via the first client computing platform a second request from the first player for using the asset according to the first type of usage, wherein using the asset according to the first type of usage requires the ownership of the asset;

performing a second verification that the first player owns the ownership of the asset as required; and responsive to the first player not owning the ownership of the asset, denying the second request.

11. The method of claim 10, wherein the first type of usage of the asset includes replaying video information that has been captured at the occurrence of the given moment in the game, wherein the video information depicts the occurrence of the given moment in the game, wherein the presentation of the game as requested depicts the video information being replayed.

12. The method of claim 10, wherein the one or more client computing platforms further include a second client computing platform associated with the second player, wherein the set of rights further includes a second right to a second type of usage of the asset, wherein the second type of usage of the asset includes replaying the game interactively from the first user game state to the second user game state as the given user-controlled character, the method further comprising:

receiving, via the second client computing platform, a third request from the second player for using the asset according to the second type of usage;

performing a third verification that the second player owns the second right;

subsequent to the third verification, creating a second presentation of the game as requested in the third request;

presenting the second presentation to the second player on the second client computing platform, wherein the second presentation of the game as requested depicts the second player interactively replaying the game from the first user game state to the second user game state as the given user-controlled character.

13. The method of claim 12, wherein the second player controls a second user-controlled character in the game, wherein the set of rights further includes a third right to a third type of usage of the asset, wherein the third type of usage of the asset includes replaying the game interactively from the first user game state to the second user game state as a user-controlled character controlled by a player that is recorded as owning the asset, the method further comprising:

receiving, via the second client computing platform, a fourth request from the second player for using the asset according to the third type of usage;

responsive to the second player owning the asset, creating a third presentation of the game;

presenting the third presentation to the second player on the second client computing platform, wherein the third presentation of the game as requested depicts the second player interactively replaying the game from the first user game state to the second user game state as the second user-controlled character.

14. The method of claim 10, wherein recording the ownership of the asset is performed through a transaction of a decentralized database that implements a distributed ledger.

15. The method of claim 10, wherein verifying that the first player owns the asset includes analyzing transactions recorded on the blockchain.

16. The method of claim 15, wherein transferring the ownership of the asset to the second player is responsive to a purchase by the second player of the asset, wherein the purchase includes a transaction that is recorded on the blockchain.

17. The method of claim 10, wherein the first type of usage of the asset includes recreating video information that has been captured at the occurrence of the given moment in the game, wherein the presentation of the game as requested depicts the recreated video information being presented.

18. The method of claim 10, wherein the given user-controlled character is controlled by the first player, and wherein the given moment in the game occurred to the first player.

* * * * *